(12) United States Patent
Clausen et al.

(10) Patent No.: US 7,830,783 B2
(45) Date of Patent: Nov. 9, 2010

(54) METHOD AND CIRCUIT FOR REDUCING THE CREST FACTOR

(75) Inventors: Axel Clausen, München (DE); Werner Henkel, München (DE); Dietmar Sträußnigg, Villach (AT); Steffen Trautmann, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 894 days.

(21) Appl. No.: 10/559,698

(22) PCT Filed: Jun. 1, 2004

(86) PCT No.: PCT/EP2004/005905

§ 371 (c)(1), (2), (4) Date: Mar. 29, 2007

(87) PCT Pub. No.: WO2004/110009

PCT Pub. Date: Dec. 16, 2004

(65) Prior Publication Data

US 2008/0043616 A1    Feb. 21, 2008

(30) Foreign Application Priority Data

Jun. 6, 2003    (DE) .................................. 103 25 839

(51) Int. Cl.
*H04J 11/00* (2006.01)
(52) U.S. Cl. ........................................ 370/210; 370/203
(58) Field of Classification Search ................. 370/210, 370/465, 480, 333, 203, 208, 335, 342; 375/296, 375/295, 298, 285, 347, 260, 340; 455/91, 455/522, 126; 708/300, 400, 200
See application file for complete search history.

(56) References Cited

U.S. PATENT DOCUMENTS 5,610,908 A    3/1997    Shelswell et al.
(Continued)

FOREIGN PATENT DOCUMENTS

DE    19838295 A1    6/1999
(Continued)

OTHER PUBLICATIONS

Henkel et al. (Par reduction revisited: an extension to Tellado's method; 6th, International OFDM Workshop; 2001; pp. 31-1-to 31-6) International OFDM Workshop Year 2001.*

*Primary Examiner*—Ayaz R Sheikh
*Assistant Examiner*—Chuong T Ho
(74) *Attorney, Agent, or Firm*—SpryIP, LLC (57) ABSTRACT

The invention relates to a method for reducing the crest factor, comprising the following method steps:
(a) IFFT transformation of a data symbol to be transmitted;
(b) looking for all peak values within a frame of the IFFT-transformed data symbol the amount of which is above a predetermined threshold;
(c) providing a sample correction function;
(d) allocating a scaling and phase rotation to the sample correction function according to the amplitude and position of the peak values found;
(e) generating a correction signal in the frequency domain from a linear combination of rotated and scaled vectors according to the scaling and position determined;
(f) modifying, particularly reducing the peak value of the data symbol to be transmitted by subtracting the correction signal, and
IFFT transformation of the peak-value-modified data symbol into the time domain.

The invention also relates to a circuit for reducing the crest factor.

16 Claims, 4 Drawing Sheets

U.S. PATENT DOCUMENTS

| | | | |
|---|---|---|---|
| 6,038,261 A | 3/2000 | Mestdagh | |
| 6,175,551 B1 | 1/2001 | Awater et al. | |
| 6,314,146 B1 * | 11/2001 | Tellado et al. | 375/346 |
| 6,424,681 B1 * | 7/2002 | Tellado et al. | 375/296 |
| 6,781,951 B1 * | 8/2004 | Fifield | 370/203 |
| 6,845,082 B2 * | 1/2005 | Bourget et al. | 370/210 |
| 7,136,423 B1 * | 11/2006 | Duvaut et al. | 375/260 |
| 7,376,689 B2 * | 5/2008 | Schenk | 708/300 |
| 7,397,860 B1 * | 7/2008 | Duvaut et al. | 375/260 |
| 7,668,266 B2 * | 2/2010 | Chen et al. | 375/347 |
| 7,697,414 B2 * | 4/2010 | Alapuranen | 370/210 |
| 2001/0022777 A1 * | 9/2001 | Bourget et al. | 370/210 |
| 2003/0026263 A1 | 2/2003 | Taunton | |
| 2003/0026332 A1 | 2/2003 | Taunton | |
| 2004/0186865 A1 * | 9/2004 | Schenk | 708/200 |
| 2004/0186867 A1 * | 9/2004 | Schenk | 708/300 |
| 2004/0234006 A1 * | 11/2004 | Leung | 375/316 |
| 2005/0069045 A1 * | 3/2005 | Laaser | 375/260 |
| 2006/0274868 A1 * | 12/2006 | Chen et al. | 375/347 |
| 2007/0076588 A1 * | 4/2007 | Alapuranen | 370/210 |
| 2009/0257526 A1 * | 10/2009 | Wang et al. | 375/298 |

FOREIGN PATENT DOCUMENTS

| | | |
|---|---|---|
| DE | 19850642 A1 | 5/2000 |
| EP | 1198088 A1 | 4/2002 |
| EP | 0725510 A1 | 8/2006 |
| WO | WO 03/026240 A2 | 3/2003 |

* cited by examiner

METHOD AND CIRCUIT FOR REDUCING THE CREST FACTOR

The invention relates to a method and to a circuit for reducing the crest factor of a data symbol to be transmitted in a multi-carrier data transmission system, in which the data symbol to be transmitted is a function of a multiplicity of signals provided within a predetermined time interval and each of these signals is allocated to a carrier, each carrier in each case occupying at least one frequency from a transmit data spectrum, at least one carrier being reserved which is not provided for the data transmission or at least not to its full extent.

In modern telecommunication, high-bit-rate data transmission on a subscriber line plays an increasingly greater role, particularly because it promises greater usable bandwidth of the data to be transmitted, in combination with bidirectional data communication.

A technology increasingly gaining in importance in recent times is the so-called multi-carrier data transmission, also known as "discrete multitone (DMT)" transmission or as "orthogonal frequency division multiplexing (OFDM)" transmission. Such data transmission is used, for example, in line-connected systems but also in the radio domain for broadcast systems and for access to data networks. Such systems for transmitting data with multi-carrier transmission use a multiplicity of carrier frequencies, the data stream to be transmitted being split for the data transmission into many parallel part-streams which are transmitted independently of one another in frequency-division multiplex. These part-streams are also called single carriers.

One representative of multi-carrier data transmission is the ADSL technology, ADSL standing for "asymmetric digital subscriber line". ADSL designates a technology which allows the transmission of a high-bit-rate bit stream of a central station to the subscriber and of a low-bit-rate bit stream leading from the subscriber to a central station. In this technology, the telecommunication line is subdivided into at least one channel for conventional telephone services (that is to say voice transmission) and at least one further channel for data transmission.

Even though very many problems are solved with such multi-carrier data transmission systems such as ADSL, some problems still remain unresolved.

One problem associated with this multi-carrier data transmission is due to the fact that due to the superposition of a great number of single carriers, they can briefly add up to very high peak values in the transmit signal. The ratio of peak value to RMS value is called crest factor and its square is called PAR (peak to average ratio). The crest factor can become very great—for example greater than 6—especially in the case of multi-carrier systems such as ADSL. Even if these peak values are very rare in the resultant amplitude and typically exist for very short periods of time, they represent a great disadvantage of multi-carrier data transmission.

A large crest factor causes various problems in the overall system of data transmission:

The maximum possible modulation of the digital/analogue converters and of the analogue circuit components such as filters and line drivers must be designed in their modulation range and in their dynamic range and resolution for the maximum peak values occurring. This means that the circuit components must have much larger dimensions than the RMS modulation. This is associated with a correspondingly high operating voltage which also leads directly to a high power dissipation. This leads to distortion of the signal to be transmitted, particularly in the case of line drivers which generally exhibit a not negligible nonlinearity.

A further problem of data transmission with high crest factors consists in that a very high peak value in the transmit signal can exceed the maximum possible modulation. In this case, clipping of the transmit signal occurs. In these cases, however, the transmit signal no longer represents the original transmit signal sequence so that transmission errors occur.

For this reason, the need exists in multi-carrier data transmission systems to largely suppress or avoid such peak values. In the literature, this problem is known by the term crest factor reduction or also PAR reduction. There are a number of approaches to solutions for reducing the crest factor:

In a known method, some carriers or carrier frequencies from the multi-carrier data transmission system are reserved (typically about 5% of the spectrum). From these reserved carriers, a time domain function with the highest possible, temporally narrow peak value is generated which forms the correction signal or, respectively, the so-called kernel. This kernel, which only occupies the reserved carriers, is iteratively weighted with an amplitude factor which is proportional to the difference of the maximum peak value and the desired maximum value and is subtracted from the transmit signal in the time domain. During this process, the kernel is cyclically displaced to the point of the corresponding peak value of the transmit signal which is responsible for the excessive crest factor. The displacement theorem of the DFT transformation ensures that only the reserved carriers are occupied even after the displacement.

In international patent application WO 03/026240 A2, a method based on the method described above is described in which peak values in the time signal to be transmitted, which are responsible for too high a crest factor, are reduced by iterative calculation of the correction signal. During this process, oversampling of the input signal and modeling of the filters or filter chain following the circuit for crest factor reduction takes place in order to ensure by this means optimum crest factor reduction and thus high quality of the data transmission.

The methods described above are based on the existence, manipulation and iterative application of correction signals in the time domain—the so-called kernels. These methods operating in the time domain are characterized by their speed and low complexity.

In the methods described above, it is disadvantageous, on the one hand, that from the data spectrum, some carriers must be reserved which are used for producing the correction signal (kernels) and which thus are no longer available for data transmission. The data transmission rate of such a multi-carrier data transmission system, and thus also its performance, therefore drops as a function of the number of reserved carriers.

In addition, high quality of the data transmission and thus as good a crest factor reduction as possible requires iterative modification by a correction signal of the data signal to be transmitted which increases the complexity of the circuit for crest factor reduction and of the corresponding method, respectively.

In some applications, therefore, there is also a requirement for specifying an alternative method which, in particular, does not operate in the time domain.

The present invention is, therefore, based on the object of providing a method and a circuit for crest factor reduction in which the crest factor reduction is not performed in the time domain.

The concept forming the basis of the present invention consists in that the generation of a correction signal for reducing the crest factor of a data signal to be transmitted does not necessarily have to take place in the time domain. Instead, the correction signal can also be generated in the frequency domain or, respectively, the data signal to be transmitted can be manipulated in the frequency domain. This is of advantage for many applications.

For this purpose, a data symbol to be transmitted is transformed by means of inverse Fourier transformation (IFFT). This data symbol to be transmitted consists of a multiplicity of carrier frequencies, some of which are reserved for forming the correction signal and are occupied with zero values. After that, the data symbol thus transformed is supplied to a model branch for forming the correction signal. This data symbol is oversampled in the model branch and filtered with a simplified filter which replicates the filter characteristic of subsequent filters. After that a search is performed for all peak values which lie above a predetermined threshold for these peak values. Using the accurate position and the amplitudes of these peak values, a correction signal is generated in the frequency domain from a linear combination of correspondingly rotated and scaled vectors. On the correction signal thus generated in the frequency domain, the corresponding data symbol on the transmit path is superimposed, the superposition taking place before the IFFT transformation of the data symbol to be transmitted on the transmit path. After the correction signal has been superimposed on the data symbol to be transmitted, the inverse Fourier transformation of the already crest-factor-reduced data symbol takes place.

Although the method according to the invention requires an additional IFFT transformation, it saves considerable circuit expenditure at another place.

As an alternative, the correction signal determined in the frequency domain can be separately transformed into the time domain by means of an IFFT transformation and only there the already transformed data signal is superimposed. The additional IFFT transformation then only effects the few carrier frequencies reserved for the correction signal and can thus be implemented with reduced expenditure.

A further advantage of this method according to the invention consists in being able to dispense with iteration steps for generating the correction signal as is required in the methods described initially.

According to the invention, only the angle of lead determined and possibly a correction scaling factor needs to be provided and stored for the correction signals during the determination of a correction signal in the frequency domain if the peak slightly deviates from the original normalization due to so-called aliasing effects. As a result, the memory requirement required for storing the sample functions (dirac-like functions) is reduced as a result of which the circuit for crest factor reduction can be constructed to be simpler with regard to the memory requirement.

Since there is only a multiplication for the few reserved carriers, the computing effort required for calculating the correction signal can be considerably reduced in this case.

Advantageous embodiments and developments of the invention can be found in the subclaims and in the description, referring to the drawing.

Figure 1:
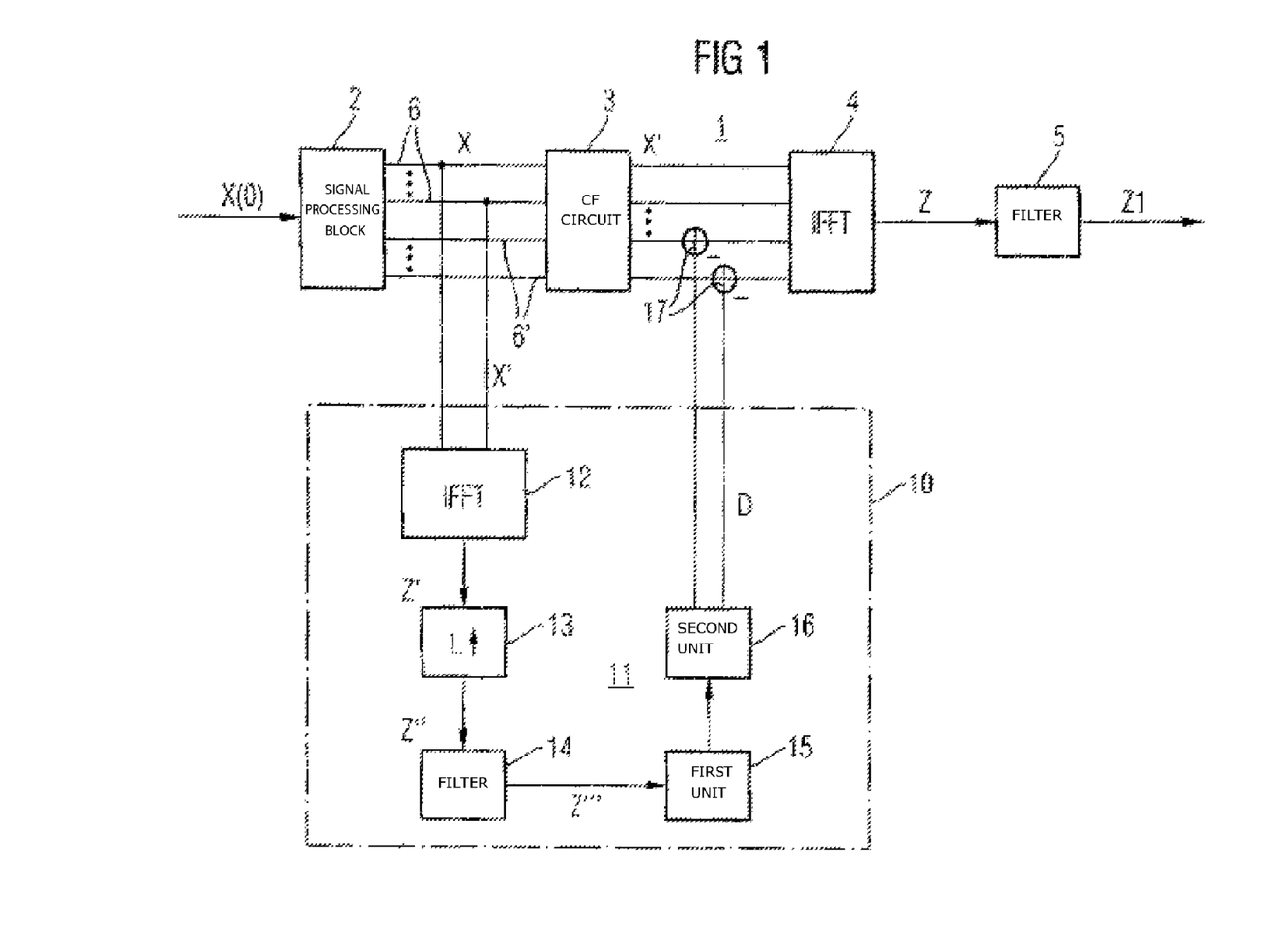
FIG. 1 shows a block diagram of a first diagrammatic representation of the circuit for crest factor reduction according to the invention of a multi-carrier data transmission system.

In the text which follows, the invention will be explained in greater detail with reference to the illustrative embodiments specified in the figures of the drawing, in which:

FIG. 1 shows by means of a block diagram a section of a multi-carrier data transmission system which is designed for reducing at least one peak value within a signal to be transmitted. Only the transmission path 1 at the transmitter end is shown which is arranged between a transmitter, not shown, and a hybrid circuit, also not shown, which is connected to the corresponding telephone line.

On the transmit path 1, a transmitter supplies a data signal X0 to be transmitted to a block 2. In block 2, a serial/parallel conversion of the data signal X to be transmitted, a bit allocation for allocating bits to the individual carrier frequencies, individual carrier frequencies being occupied by zero for the method according to the invention, and QAM mapping for allocating the QAM dots take place. The data signal X describes a sequence of blocks of complex Fourier coefficients from which, by means of an IFFT transformation, the time domain signal Z is derived which is subdivided into time intervals—the so-called frames—corresponding to the sampling rate and to the IFFT length of the system. In the text which follows, the section of the data signal X within such a frame or block is called a data symbol. A data symbol within the frame is subdivided into a predetermined number of carrier frequencies in the case of the multi-carrier transmission system. In the case of an ADSL data transmission, a data frame for a data symbol consists of 512 carrier frequencies. Some of these carrier frequencies, typically 10-20 carrier frequencies, are reserved for forming a correction signal for reducing the crest factor. For this purpose, just these reserved carriers are set to zero or additionally or alternatively occupied with additional data in a certain percentage.

At the output of block 2, the data signal X to be transmitted, which is already subdivided into a multiplicity of carrier frequencies, can be picked up. This data signal X is coupled for the purpose of buffering into a buffer storage device 3 which is used for delaying or, respectively, temporarily storing these data signals X and which at its output supplies the suitably delayed data signal X' to a subsequent IFFT module 4. In the IFFT module 4, the supplied signal X' is modulated by means of inverse Fourier transformation. The signal Z thus modulated, which exhibits a sampling frequency of 2.208 MHz in the case of an ADSL data transmission and a sampling frequency of 4.416 MHz in the case of an ADSL+ data transmission, is supplied at its output to a subsequent filter unit or filter chain 5. The data signal Z output by the IFFT unit 4 is filtered in the filter 5 and output as signal Z1 which, as will be explained in detail in the text which follows, is still crest-factor-reduced.

To generate crest-factor-reduced data signals Z, Z1, a circuit for crest factor reduction 10 is provided according to the invention. The circuit for crest factor reduction 10 is arranged in parallel with a part of the transmit path 1 and defines a model path 11. The model path 11 branches away from the transmit path 1 at the data paths 6 of block 2 at the output end, so that the CF circuit 10 is also supplied with the data signal X subdivided into individual frequency data carriers. The carrier frequencies 6 occupied with data are supplied to a further IFFT module 12 which advantageously exhibits the same characteristic as the IFFT module 4. If the carrier frequencies 6' are not occupied with additional data, they are typically occupied with zero.

The IFFT module 12 generates at its output end an output signal Z' which, due to the identical characteristic, corresponds as precisely as possible to the output signal Z generated by the IFFT module 4. This signal Z' is supplied to an oversampling block 13 which oversamples the signal Z' L-fold, for example 4-fold or 2-fold. The L-fold oversampled signal Z" is supplied to a downstream model filter 14. The model filter 14 is as accurate as possible a replica of the filter or filter chain 5 following the CF circuit 3. This takes into account the characteristic of the filter 5 and its influence on the signal Z to be transmitted. It makes it possible to ensure that, although the output signal Z has been changed by the output filter 5 and there is thus the possibility of generating an excessive crest factor, the filtered output signal Z1 still does not exhibit any excessive peak values.

The model filter 14 is followed by a computing unit 15 which determines from the oversampled and filtered signal Z''' the corresponding peak values, their amplitude and their position within the data frame. The computing unit 15 also generates a scaling factor and an angle of phase rotation which determines a time displacement for a correction signal. The computing unit 15 is followed by a unit 16 which generates at its output a correction signal D which is used for reducing the crest factor of the data signal X to be transmitted. For this purpose, the unit 16 performs a phase rotation and scaling of the correction signal D as a function of the position and amplitude, determined by the computing unit 15 of the respective maximum value.

On this correction signal D, the signal X', suitably delayed by the buffer device 3, is superimposed in such a manner that only the reserved carrier frequencies, which are not occupied by data, in the frequency domain are occupied by the correction signal D.

The delayed signal X' thus exhibits carrier frequencies 6 provided for the data transmission and carrier frequencies 6' not provided for the data transmission which contain the correction signal in the frequency domain.

From the reserved carrier frequencies 6' thus generated, dirac-like time domain functions producing a reduction in the crest factor in the output signals Z, Z1 can be generated by means of the IFFT modulation in block 4.

The computing unit 15 is preferably constructed as a program-controlled unit, particularly as a microprocessor or microcontroller. In this arrangement, it can also be provided that individual or several of the units 12, 13, 14, 16 of the CF circuit are also implemented in the functionality of the microprocessor or microcontroller.

Figure 2:
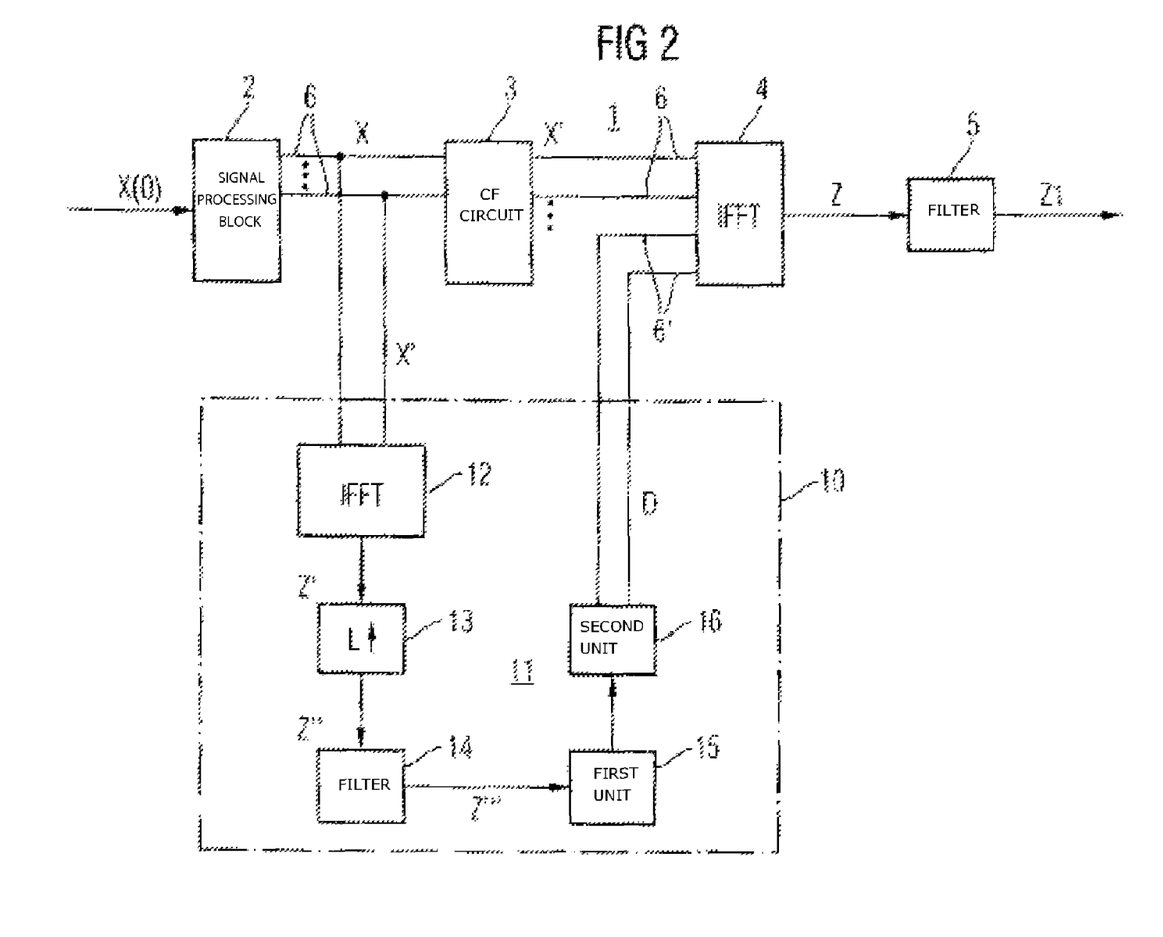
FIG. 2 shows a second illustrative embodiment of a circuit for crest factor reduction.

In contrast to the illustrative embodiment in FIG. 1, the illustrative embodiment in FIG. 2 shows a section at the transmitting end of a multi-carrier data transmission system in which carrier frequencies designated with reference symbol 6' in FIG. 1 have been occupied by zero values. For this reason, these lines 6' occupied with zero values between the units 2 and 3 in FIG. 2 have not been shown. As a result, the adding devices 17 can also be omitted so that the correction signals D generated by the unit for phase rotation and scaling 16 are directly supplied to the corresponding inputs of the IFFT module 4.

Figure 3:
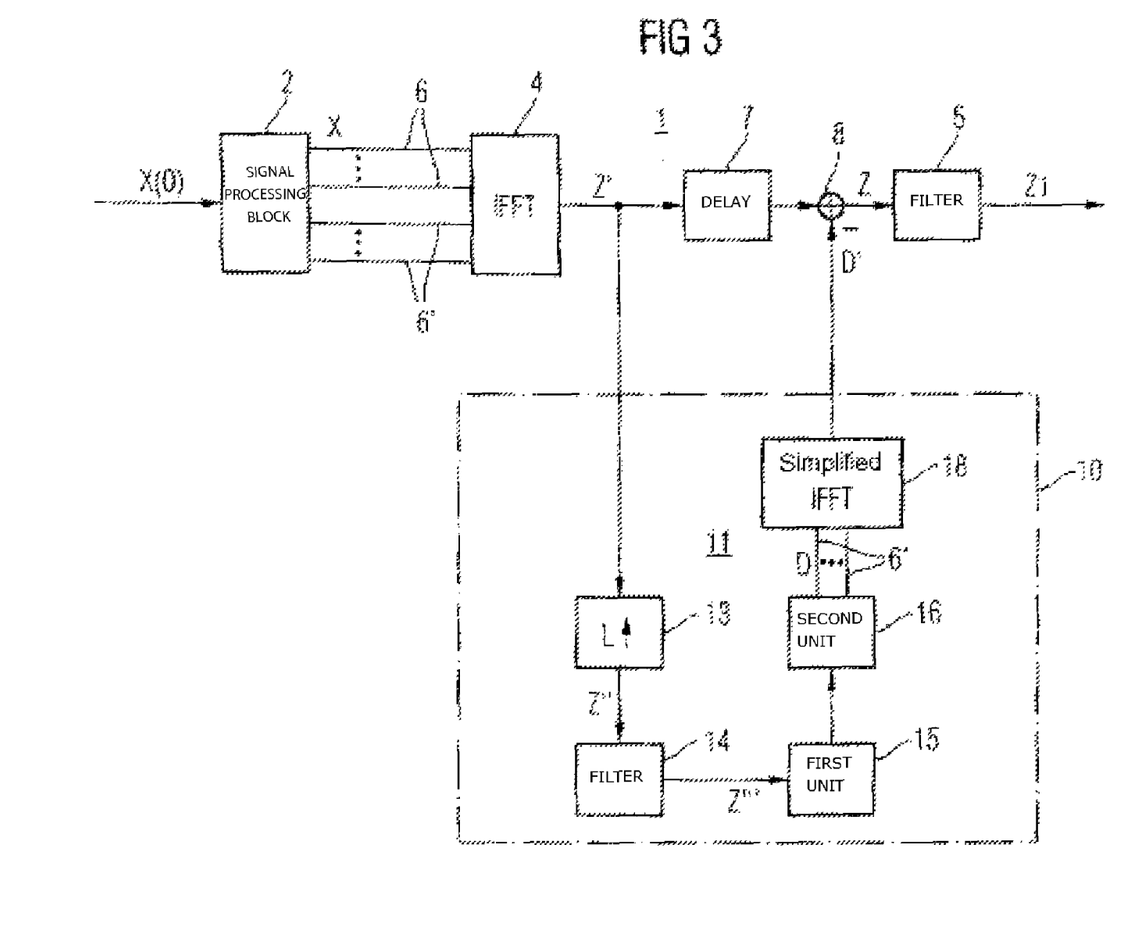
FIG. 3 shows a third illustrative embodiment of a circuit for crest factor reduction.

FIG. 3 shows by means of a block diagram a third, particularly preferred illustrative embodiment of a circuit for crest factor reduction according to the invention, in which the generation of a correction signal in the frequency domain is performed.

In contrast to the illustrative embodiments in FIGS. 1 and 2, block 2 here supplies the signal X, already subdivided into individual carrier frequencies, directly to the IFFT module 4. The IFFT module 4 transforms this signal X into the time domain so that the transmit signal Z' can be picked up in the time domain at the output of the IFFT module 4. This transmit signal Z' is supplied to a subsequent delay element 7 which takes into consideration a delay caused by the CF circuit 10. The delay element 7 is followed by the output filter 5 or, respectively, a corresponding filter chain 5 which generates at its output the crest-factor-reduced output signal Z1.

According to the invention, a CF circuit 10 is also provided in this case. In contrast to the illustrative embodiments of FIGS. 1 and 2, the CF circuit 10 in the illustrative embodiment in FIG. 3 picks up the transmit signal Z' provided at the output by the IFFT module 4. This signal Z' is processed further in a similar manner as in the illustrative embodiments of FIGS. 1 and 2. The unit 16 in this case additionally performs a quantization of the output signal generated by the computing unit 15. The unit 16 generates the correction signals D which are supplied to a subsequent IFFT module 18 on corresponding lines 6'. Advantageously, the IFFT module 18 can be of simplified construction in this case since only correction signals D are coupled in via the lines 6' on the reserved carrier frequencies. The simplified IFFT module 18 generates at its output a correction signal D' which is subtracted from the output signal of the delay element 7 in the adding device 8 so that the transmit signal Z is formed. This transmit signal Z is filtered in the filter 5 and output as crest-factor-reduced output signal Z1.

Figure 4:
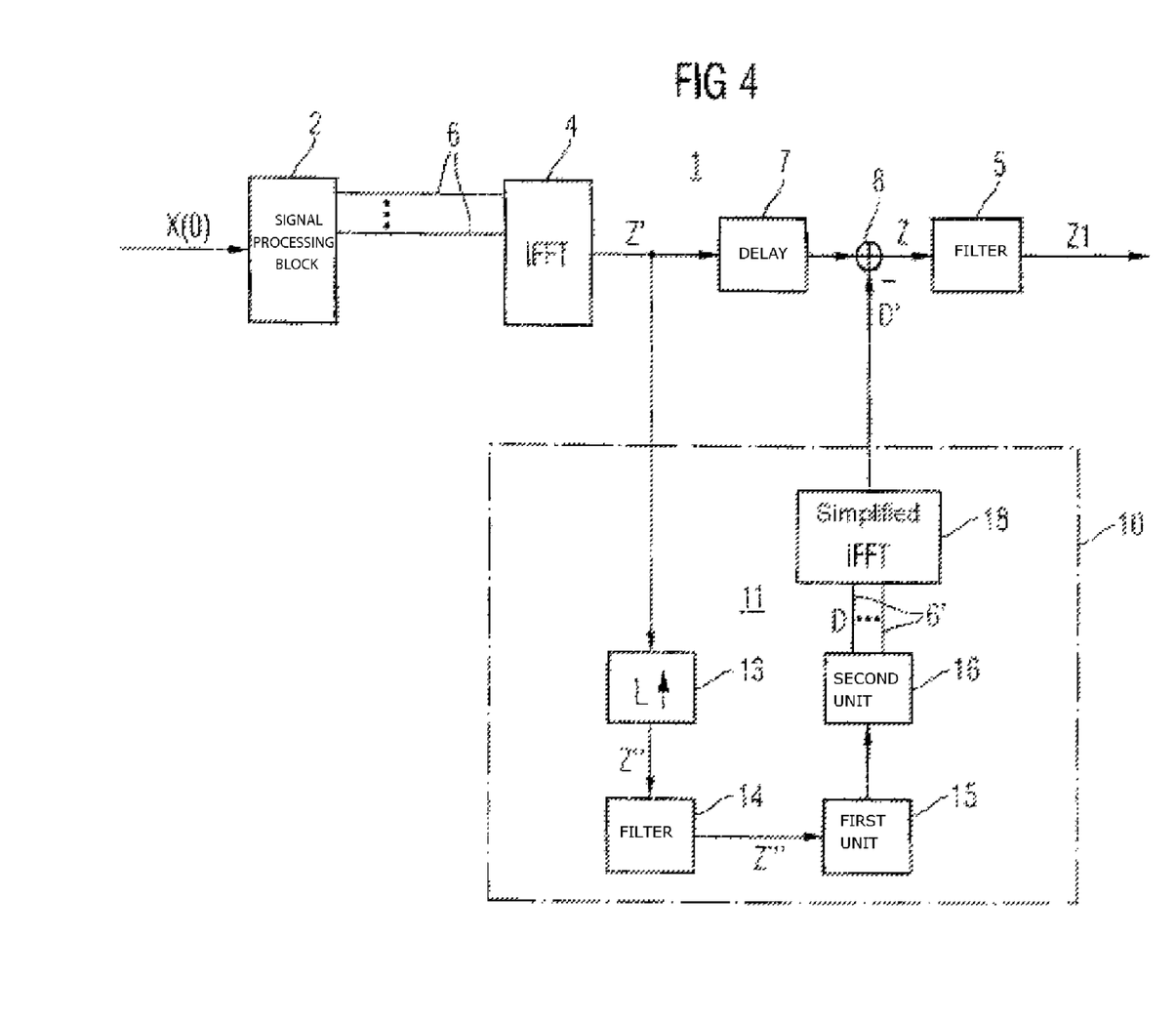
FIG. 4 shows a fourth, particularly preferred illustrative embodiment of a circuit for crest factor reduction.

In contrast to the illustrative embodiment in FIG. 3, the reserved carrier frequencies on lines 6' in the illustrative embodiment in FIG. 4 are again occupied by zero and, as a consequence, have not been shown.

The method for reducing the crest factor in the frequency domain according to the invention will be described in greater detail by means of the algorithm described in the text which follows:

For generating dirac-like time domain functions for the correction signals D, it has been found to be successful to select from the available carrier frequencies randomly distributed carrier frequencies for generating this dirac-like correction function. With a real-valued initialization of these carrier frequencies in the frequency domain with a constant value K, a usable dirac-like time domain function is obtained, as a rule, in always normalized form. The constant value K is dimensioned in such a manner that this normalized time domain function exhibits a peak value normalized to one at the position of the peak value of the corresponding time vector of the correction signal.

Depending on the characteristic of the subsequent filter 5 in the signal path 1 only a basic scaling $\alpha_0$ and a displacement $\Phi_0$ of the dirac-like correction function has to be taken into consideration additionally in order to take into account the delay and scaling of the correction function due to the filtering. Since such a correction function does not explicitly need to be stored in a memory, this results at least in memory advantages for the implementation with the generation of a correction function in the frequency domain.

The method according to the invention is distinguished by the following method steps:

1. IFFT transformation of the k-th transmit symbol X(k) with zero values in the reserved carriers in the time domain. After the oversampling, filtering with the simplified model filter 14 of the model path 11:

2. Looking for all peak values or samples $p_i(k)$ within the frame of the signal Z'''(k) where i=1, ..., R, which are above a predetermined threshold, R designating the number of peak values.

3. Correlating the equivalent scaling and displacement of the normalized dirac-like correction function with each peak value or sample $p_i(k)$:

$$p_i(k) \to \{\alpha_i(k), \phi_i(k)\}$$

4. Generating the correction signal D(k) in the frequency domain from a linear combination of rotated and scaled vectors according to the $\{\alpha_i(k), \phi_i(k)\}$ pairs determined, $$[D(k)]_n = \begin{cases} k \cdot \sum_{i=1}^{R} \alpha_i(k) \cdot e^{-j\phi_i(k) \cdot n} & \text{if } n \in M \\ 0 & \text{otherwise} \end{cases}$$

where n designates the carrier index over all carrier frequencies and M designates the set of carrier frequencies intended for the correction function.

5. Modifying the correction signal D(k) by the basic displacement $\phi_0$ and basic scaling $a_0$:

$$[\tilde{D}(k)]_n = a_0 \cdot [D(k)]_n \cdot e^{-j\phi_0 n}$$

6. IFFT transformation of the correction signal D(k) (with zero values in the carriers reserved for the data transmission) into the time domain:

$$\tilde{D}(k) \bullet\!-\!\circ \tilde{d}(k)$$

7. Peak value reduction by means of subtraction of the correction signal from the transmit symbol X'(k):

$$Z(k) = Z'(k) - \tilde{d}(k)$$

8. Further processing of the crest-factor-reduced transmit symbol Z(k) on the actual signal path 1.

In the case of the illustrative embodiments of FIGS. 1 and 2, the IFFT transformation of the correction signal D(k) occurs after the peak value reduction by means of subtraction of the correction signal from the transmit symbol, that is to say method steps 6 and 7 are exchanged in this case.

In a particularly advantageous embodiment, which has already been executed by means of FIGS. 1 and 3, additional data can be provided on the reserved carrier frequencies. In this arrangement, the correction signal is quantized to a higher-level QAM pattern and the additional data are added in the form of a lower-valued QAM in the same pattern around a virtual origin of coordinates.

For this purpose, a higher-valued QAM pattern is defined within a corresponding integrated circuit for the correction signals for crest factor reduction and some bits in the reserved carrier frequencies, for example some LSB bits, are used for the data transmission and the rest is used for the correction signal for crest factor reduction. In the model branch, calculation is carried out as usual in the time domain after the IFFT transformation with oversampling and model filtering. The part-signal carrying data in the reserved carrier can easily be taken into consideration as well. However, the update for the signal path occurs in a frequency domain as described above. After a last iteration, the correction signal is quantized to one of the possible signal points given by the MSB bits. For example, two data bits (two LSB bits) of a QAM pattern can be used for the additional data. This leaves $2^6=64$ possible values for the correction signal as a quasi-virtual coordinate origin for a quadruple QAM setup. The advantage of this is that immediate decoding is possible in the receiver by ignoring the respective MSB bits.

Although the present invention has been described above by means of preferred illustrative embodiments, it is not restricted to these but can be modified in many ways.

In particular, the invention is not restricted to the above data transmission systems and methods but can be expanded, for the purpose of crest factor reduction, to all systems and methods based on multi-carrier data transmission. In particular, the invention shall not be restricted to ADSL data transmission but can be expanded to all xDSL data transmissions. Mobile applications such as DAB (digital audio broadcasting) or DVB-T (digital video broadcasting-terrestrial) or OFDM-based WLAN (wireless local area network) applications are also conceivable.

Naturally, the elements of the circuit for crest factor reduction and the specified IFFT modules and filters are conventional hardware components but can also be implemented as software.

As well, the invention shall not necessarily be restricted to 2-fold or 4-fold oversampling of the data signal to be transmitted. Instead, it can also be provided that no oversampling, even subsampling or oversampling of any degree takes place.

In particular, the invention shall not be restricted to the above numerical information but can be arbitrarily modified within the framework of the invention and of expert knowledge.

LIST OF REFERENCE DESIGNATIONS

1 Transmit path
2 Data block
3 Buffer device
4 (First) IFFT module
5 (Output) filter
6 Carriers/lines reserved for the data transmission
6' Carriers/lines reserved for the correction function
7 Delay element
8 Adding device
10 Circuit for crest factor reduction, CF circuit
11 Model path
12 (Second) IFFT module
13 Block for oversampling
14 Model filter
15 Computing unit
16 Unit for phase rotation and scaling of the correction function
17 Adding device
18 Block for quantization
X Input signal
X Input signal subdivided into carrier frequencies
X' Delayed input signal subdivided into carrier frequencies
Z (IFFT-modulated) signal/data symbol to be transmitted
Z1 Crest-factor-reduced signal/data symbol to be transmitted
Z' IFFT-modulated signal/data symbol
Z" Oversampled signal/data symbol
Z''' Oversampled, filtered signal/data symbol
D Correction signal
D' Correction signal

The invention claimed is:

1. A method of reducing a crest factor of a data symbol to be transmitted in a multi-carrier data transmission system, in which the data symbol is a function of a plurality of signals provided within a predetermined time interval, each of the plurality of signals allocated to a carrier, each carrier occupying at least one frequency from a transmit data spectrum, at least one carrier having at least some reserved data carrying capacity not provided for data transmission, the method comprising:

(a) performing an inverse Fourier transformation (IFFT) of the data symbol to be transmitted using a first IFFT module of a second signal path that receives the data symbol in parallel with a first signal path;
(b) identifying peak values within a frame of the IFFT-transformed data symbol above a predetermined threshold using a first unit of the second signal path;
(c) providing a sample correction function at an output of the first unit;
(d) generating one or more vectors by allocating a scaling and phase rotation to the sample correction function according to the amplitude and position of the identified peak values using a second unit of the second signal path;
(e) generating a correction signal in the frequency domain from a linear combination of the one or more vectors at an output of the second unit;
(f) modifying the peak value of the data symbol to be transmitted by subtracting the correction signal at a combining device arranged to receive the data symbol on the first signal path and to receive the correction signal at an output of the second signal path; and
(g) providing the modified data symbol in the time domain at an output of the combining device.

2. The method according to claim 1, further comprising, after step (b), oversampling at an oversampling unit of the signal path and/or filtering of the IFFT-transformed data symbol at a filter of the signal path.

3. The method according to claim 1, wherein:
the data symbol to be transmitted is in the time domain prior to modification in step (f).

4. The method according to claim 1 wherein:
step (g) further comprises performing an IFFT transformation on the modified data symbol.

5. The method according to claim 1, wherein step (c) further comprises providing the sample correction function as a dirac-like function.

6. The method according to claim 1, wherein the at least one carrier having at least some reserved data carrying capacity is occupied exclusively by zero values.

7. The method according to claim 1, wherein the at least one carrier having at least some reserved data carrying capacity is occupied with additional data.

8. A circuit for reducing a crest factor of a data symbol to be transmitted in a multi-carrier data transmission system, in which the data symbol to be transmitted is a function of a plurality of signals provided within a predetermined time interval, each of the plurality of signals allocated to a carrier, each carrier in each case occupying at least one frequency from a transmit data spectrum, at least one carrier having at least some reserved data carrying capacity not provided for data-transmission, comprising:

(A) a transmit signal path configured to propagate a data signal to be transmitted;
(B) a second signal path arranged in parallel with at least a portion of the transmit path, the second signal path including,
a first inverse Fourier transformation (IFFT) module configured to transform the data symbol to be transmitted into the time domain,
a first unit configured to determine at least one peak value within a predetermined time interval of the transformed data signal,
a second unit configured to generate a correction signal in the frequency domain from a linear combination of rotated and scaled vectors according to a scaling and position of the peak values determined; and
(C) a combining device connected to an output of the second signal path and to the transmit path configured to superimpose the correction signal on the data symbol to be transmitted on the transmit signal path.

9. The circuit according to claim 8, further comprising:
(D) a second IFFT module configured to transform the data symbol modified by the correction signal.

10. The circuit according to claim 8, wherein the second signal path further comprises a second IFFT module configured to transform the correction signal into the time domain, and wherein the second IFFT module is operably coupled to provide the transformed correction signal to the combining device.

11. The circuit according to claim 8, wherein the second signal path further comprises an oversampling unit configured to oversample the data symbol to be transmitted.

12. The circuit according to claim 8 wherein the second signal path further comprises a non-recursive model filter having a characteristic of one or more filters following the combining device.

13. The circuit according to claim 8 wherein the non-recursive model filter comprises an FIR filter.

14. The circuit according to claim 8, wherein the first unit comprises a programmable processing device.

15. The circuit according to claim 14, wherein the second unit also comprises the programmable processing device.

16. The circuit according to one of claim 10, wherein the second IFFT module is configured such that only a first set of carrier frequencies corresponding to the at least one carrier having at least some reserved data carrying capacity can be supplied to the second IFFT module, and wherein a second set of carrier frequencies can be supplied to the first IFFT module.

* * * * *